C. A. LANGHAMMER.
ATTACHABLE TOP FOR CAKES AND SIMILAR ARTICLES OF PASTRY.
APPLICATION FILED NOV. 11, 1913.

1,129,406.

Patented Feb. 23, 1915.

Witnesses:

Inventor
Charles A. Langhammer
By his Attorneys
Briesen & Zueype

UNITED STATES PATENT OFFICE.

CHARLES A. LANGHAMMER, OF NEW YORK, N. Y.

ATTACHABLE TOP FOR CAKES AND SIMILAR ARTICLES OF PASTRY.

1,129,406.    Specification of Letters Patent.    Patented Feb. 23, 1915.

Application filed November 11, 1913. Serial No. 800,250.

*To all whom it may concern:*

Be it known that I, CHARLES A. LANGHAMMER, a citizen of the United States, residing at New York city, borough of Bronx, State of New York, have invented a new and useful Attachable Top for Cakes and Similar Articles of Pastry, of which the following is a specification.

Cakes, tarts and similar articles of pastry are frequently embellished on their surface with various ornamentations, which are designed to increase their attractiveness or render them appropriate for special occasions. These ornamentations, consisting of sugary designs rising from the glazed surface of the cake, require considerable skill in their execution, and were generally not within the compass of ordinary bakers, so that orders for the same were heretofore either not encouraged or were passed over to establishments especially fitted up for their execution by the employment of high priced confectioners.

It is the object of my invention to obviate the difficulty thus encountered, by providing ready made tops of various designs, a stock of which may be kept on hand by the baker, and applied to his goods as occasion may require. The construction of these ready made tops is such, that they may be preserved for a considerable length of time, that they are not liable to break by handling, and that they will blend with and firmly adhere to the icing which is spread over the cake by the baker.

Figure 1:
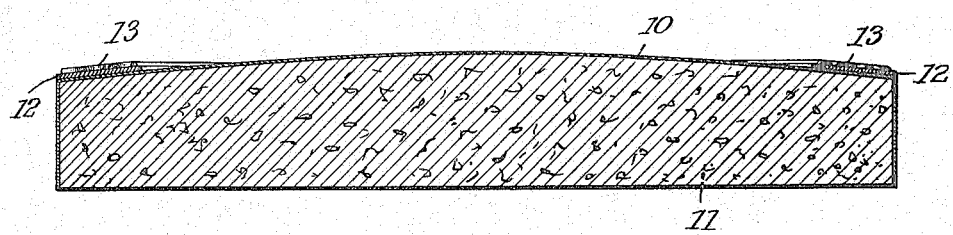
Figures 2, 3:
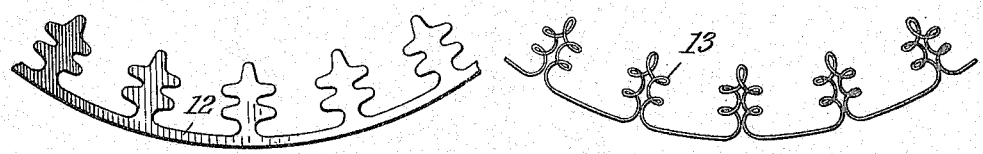
Figure 4:
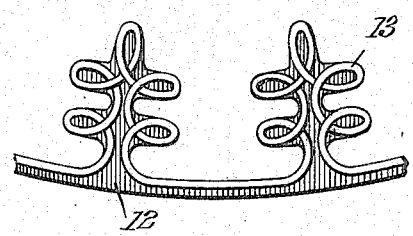

In the accompanying drawing: Figure 1 is a vertical section of a cake provided with my improved attachable top; Fig. 2 a detail of part of the base; Fig. 3 a detail of part of the coating, and Fig. 4 a detail of part of the attachable top complete.

In carrying out my invention, I first prepare a base consisting of a thin plastic eatable layer, which is cut out by a die or otherwise to the size and ornamental shape desired, and is so constituted that it will readily adhere to the icing 10, which is spread by the baker over the top of the cake 11. The drawing shows this base 12 to be made in the form of a narrow rim, from which extend inwardly a number of leafy spurs, but it is of course to be understood that this design, is but one of an indefinite number which may be selected. The base should however be made of an open work character, so that the icing will be partly exposed to form a field for the embellishment furnished by the base.

A superior base may be formed of about 9 parts by weight of sugar, $1\frac{1}{2}$ parts of glucose, 1 part of syrup, $\frac{1}{4}$ part of albumen and $\frac{1}{10}$ part of a vegetable oil together with some coloring matter, adapted to blend with the color of the icings more generally employed. The glucose, syrup and oil are heated and mixed, the sugar is worked into the mixture, and after the latter has somewhat cooled, the albumen and coloring agent are added. The dough thus formed is rolled out into a sheet say to the thickness of $\frac{1}{16}$ of an inch and is cut out by the die or otherwise, to assume the ornamental open work pattern desired. To the upper surface of the base formed in the above manner is now applied a raised sugary coating or piping 13, composed preferably of suitable proportions of albumen, sugar and gum. This coating should cover the base in a substantial manner, though parts of the latter may protrude here and there without detriment to the general appearance. The coating may be applied by hand or by machine, its application being quite simple, as it is only necessary to follow the lines of the pattern during the laying on of the coating.

The ready made tops formed as described, are intended to be made in quantities at certain establishments, ready to be delivered to the baker. The latter will match a suitably designed top, with the size and icing color of the cake to be embellished and then simply place the top in proper position upon the cake so as to become supported upon the icing. Owing to the hygroscopic and adhesive qualities of the base as well as of the icing, these two elements will quickly unite, in such a manner that the superposed top will combine with the body of the cake and form an integral part thereof. It will thus be seen that by my invention, a new article of commerce is furnished, which fulfils an important function by permitting the preparation and distribution of ornamental pastry within a wider sphere and at less cost and trouble than heretofore.

I claim:

1. An attachable top for cakes comprising an open work plastic eatable sheet adapted to be secured to a cake-body, and a raised sugary coating carried by said sheet.

2. Method of making an attachable cake top which consists in preparing a thin hygroscopic base of edible material, imparting to said base a suitable ornamental open work configuration, and then applying to the upper surface of the base a raised sugary coating.

CHARLES A. LANGHAMMER.

Witnesses:
ARTHUR E. ZUMPE,
FRANK V. BRIESEN.